United States Patent Office 3,650,980
Patented Mar. 21, 1972

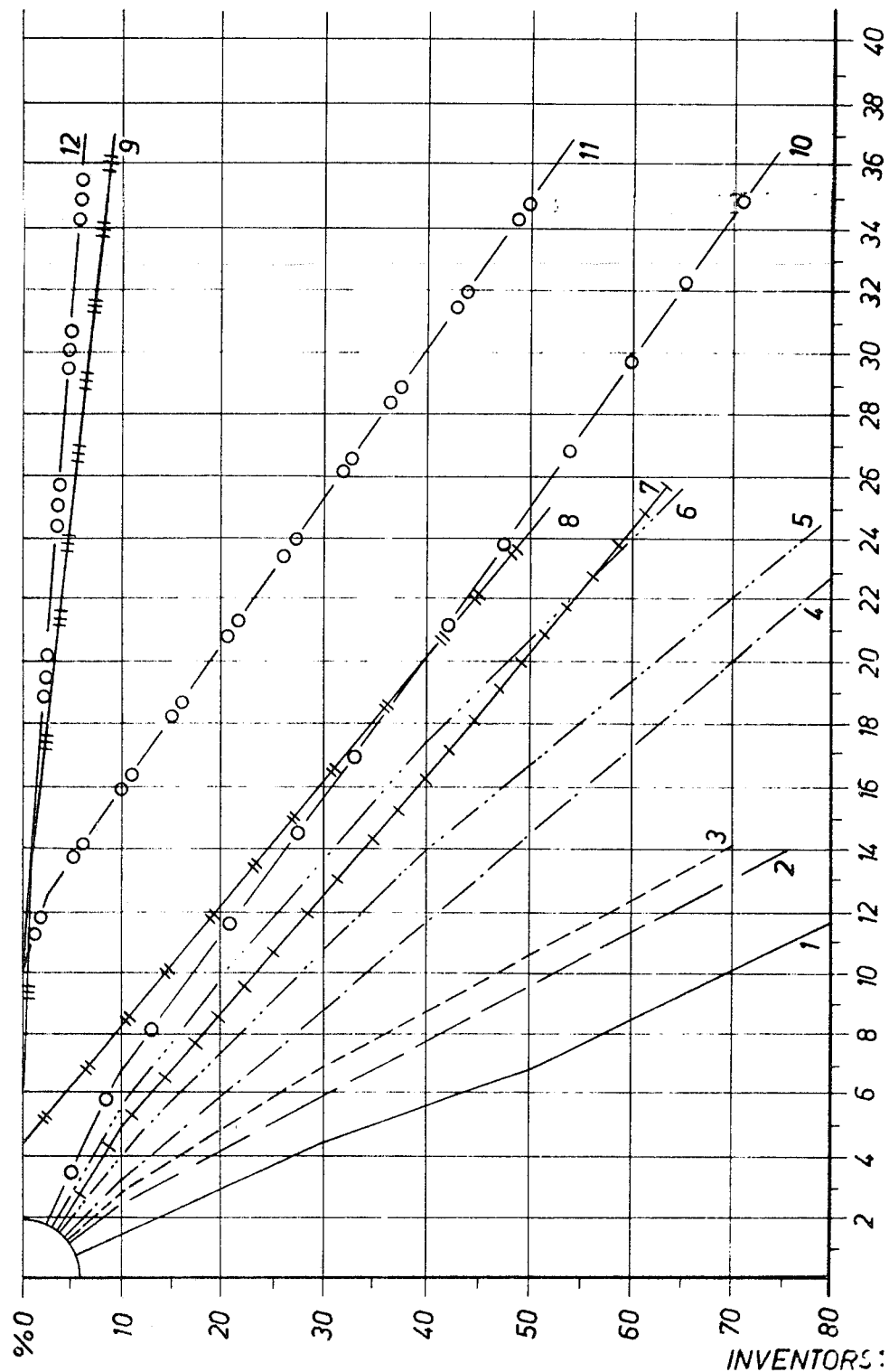

3,650,980
RETARDING WATER EVAPORATION WITH SURFACE FILMS OF OXO ALCOHOLS CONTAINING ORTHOSILICIC ACID ESTER
Herbert Göthel, Oberhausen-Holten, Hans Feichtinger, Dinslaken, and Hans Tummes, Oberhausen-Strakrade-Nord, Germany, assignors to Ruhrchemie Aktiengesellschaft
Filed Oct. 22, 1969, Ser. No. 868,535
Claims priority, application Germany, Nov. 20, 1968, P 18 10 018.0
Int. Cl. B01j *1/18*
U.S. Cl. 252—384                                      5 Claims

ABSTRACT OF THE DISCLOSURE

A film forming composition for application to water surfaces to retard evaporation loses comprises a higher alkyl alcohol and up to three weight percent of an orthosilicic acid ester of an oxyalkylated alcohol.

---

To reduce evaporation losses in territories with small occurrence of water, protective layers of higher boiling alcohols have been applied over the surface of bodies of water in such areas. Thus, emulsified cetyl and stearyl alcohols have been applied to water surfaces in an attempt to retard evaporation.

Experiments employing instead of the alcohol emulsions higher boiling liquid alcohols which can be more easily sprayed from aircraft engines, showed that continuous thin layers of those alcohols cannot be obtained and that only single oily spots resulted.

There is, therefore, a desideratum to increase the spreading rate of the alcohols over water surfaces to such an extent that continuous uniform alcohol films can be obtained. Any agents used should be practically insoluble in water and non-poisonous for human beings, animals and plants.

It has now been found that excellent evaporation retarding compositions for such purposes comprise aliphatic alcohols having at least 10 carbon atoms, especially up to 20 carbon atoms, to which have been added up to 3 percent, preferably 0.2 to 0.8 percent by weight of orthosilica acid esters of oxyalkylated alcohols of the general formula $$Si[O(C_mH_{2m}O)_nR]_4$$

wherein R represents alkyl radicals having at least 10 carbon atoms, preferably up to 24 carbon atoms, $n$ has a value in the range of from 4 to 30 and $m$ has a value of 2 to 4.

The evaporation retarding mixtures according to the invention are characterized by a high migration velocity and form continuous films even at a strength of 10μ. These films are stable under intensive thermal radiation. Re-formation of the continuous layer or film to single oily spots has not been observed.

Alcohols obtained by the hydroformylation of olefins having terminal double bonds, i.e. by the so-called oxo-synthesis, as well as alcohols obtained by consecutive reactions of such hydroformylation products, proved to be well suited for use in the evaporation retarding mixtures of this invention. Especially valuable are Ovo-alcohols having at least 12 carbon atoms. These branched alcohols are liquid. They are characterized by very low solubility in water and minimum volatility. Outstanding effects can be obtained with iso-octadecyl alcohol.

Orthosilicic acid esters, wherein $n$ has a value in the range of from 6 to 20 are especially well suited as additives to be admixed with the said alcohols. The $(C_mH_{2m}O)$-groups of the orthosilicic acid esters are preferably $(CH_2CH_2O)$- and/or $(CH_2CH(CH_3)O)$-groups. These orthosilicic acid esters are liquid, paste-like or solid substances.

Orthosilicic acid esters derived from oxyethylated lauryl and stearyl alcohols respectively having 6 or 10 ethylene oxide groups proved to be extremely effective additives. The esters are generally added in amounts of about 0.5 percent by weight. Their surface activity increases with increasing amounts of ethylene oxide-groups in the molecule. An addition of for instance 0.2 percent by weight of orthosilicic acid esters derived from oxyethylated lauryl alcohol having 20 ethylene oxide groups is sufficient. Amounts of about 0.2 to 0.8 percent by weight generally proved to be advantageous.

Some properties of orthosilicic acid esters of oxyethylated lauryl alcohols having 6 and 10 ethylene oxide groups respectively are hereinafter set out.

|  | $Si(O(CH_2CH_2O)_6C_{12}H_{25})_4$, liquid | $Si(O(CH_2CH_2O)_{10}C_{12}H_{25})_4$, solid |
|---|---|---|
| Density, $d_{20}$ | 1.000 | 1.012 |
| Refractive index | [1] 1.4605 | [2] 1.4525 |
| Molecular weight | 1,824 | 2,528 |
| Composition in percent of: |  |  |
| C | 62.62 | 60.70 |
| H | 11.11 | 10.52 |
| O | 24.74 | 27.67 |
| Si | 1.51 | 1.11 |

[1] $n_{20}^D$.
[2] $n_{50}^D$.

Ethoxylated lauryl- as well as stearyl-alcohols as such are only of restricted applicability as non ionic tensides. Their surface activity is much lower than that of their orthosilicic acid esters. Moreover their use as additives leads to disturbing turbidity as well as to the formation of deposits and inhomogeneities in the alcohol layer.

The drawing:
The drawing is a graph of the results given by the evaporation retarding mixtures described in the examples. On the graph, the ordinate is marked in days, and the abscissa in weight percent evaporation loss.

EXAMPLE I 10 ml. (8.47 g.) isooctadecylalcohol were sprayed on a water surface of 1 m². The alcohol formed single discontinuous oily spots on the water surface.

If a corresponding amount of a mixture of isooctadecyl-alcohol and 0.5 percent by weight of a liquid orthosilicic acid ester of oxyethylated lauryl alcohol having 6 ethylene oxide groups was applied in similiar manner to a water surface of equal size, the admixture extended immediately to a continuous noninterrupted transparent surface layer of a thickness of 0.01 mm. No re-formation of the surface layer into oily spots was observed even after irradiation of the surface with infrared light for ten days at a surface temperature of the water of 35° C.

EXAMPLE II 5 ml. (4.21 g.) isotridecyl alcohol were sprayed on a water surface as described in Example I. Single discontinuous oily spots were formed on the water surface.

If the test was repeated with a corresponding amount of a mixture of isotridecylalcohol and 0.4 percent by weight of a liquid orthosilicic acid ester of oxyethylated stearyl alcohol having 10 ethylene oxide groups (prepared at 50° C.), a continuous noninterrupted transparent surface layer having a thickness of 0.005 mm. was immediately formed. If this surface layer was irradiated under the conditions described in Example 1 no re-formation to single oily spots was observed.

EXAMPLE III

In order to characterize the influence of the orthosilicic acid esters on the evaporation retarding effect of the admixtures according to the invention, the evaporation of water at 50° C. per unit of time was tested under similar conditions with regard to the thickness of the protecting layer as well as to the amount of the orthosilicic acid ester of polyoxyethylated lauryl and stearylalcohol respectively contained in the protecting surface layer. The tests were carried out with admixtures consisting of isooctadecyl-alcohol as the high boiling alcohol to which had been added polyoxyethylated lauryl alcohol having 10 ethylene oxide groups and polyoxyethylated stearyl alcohol having 10 ethylene oxide groups respectively.

12 similar glass vessels, each containing 1500 ml. tap water having a surface of 9 cm. x 14 cm.=126 cm.$^2$. One vessel was not treated, while the 11 remaining vessels were supplied with evaporation retarding surface layers of a thickness in mm. as set out hereinbelow. The vessels were heated to 50° C. in a heating chamber and the water losses by evaporation were regularly recorded.

The evaluated test results are expressed by curves 1 to 12 in the attached diagram.

The compositions used were:
Curve 1—no surface layer
Curve 2—0.01 mm. isooctadecanol without addition
Curve 3—0.01 mm. isooctadecanol containing 0.5 percent by weight orthosilicic acid ester of lauryl alcohol having 10 ethylene oxide groups
Curve 4—0.1 mm. isooctadecanol without addition
Curve 5—0.1 mm. isooctadecanol containing 0.5 percent by weight orthosilicic acid ester of lauryl alcohol having 10 ethylene oxide groups
Curve 6—0.1 mm. isooctadecanol containing 0.5 percent by weight orthosilicic acid ester of stearyl alcohol having 10 ethylene oxide groups
Curve 7—0.5 mm. isooctadecanol without addition
Curve 8—0.5 mm. isooctadecanol containing 0.5 percent by weight orthosilicic acid ester of lauryl alcohol having 10 ethylene oxide groups
Curve 9—0.5 mm. isooctadecanol containing 0.5 percent by weight orthosilicic acid ester of stearyl alcohol having 10 ethylene oxide groups
Curve 10—1 mm. isooctadecanol without addition
Curve 11—1 mm. isooctadecanol containing 0.5 percent by weight orthosilicic acid ester of lauryl alcohol having 10 ethylene oxide groups
Curve 12—1 mm. isooctadecanol containing 0.5 percent by weight orthosilicic acid ester of stearyl alcohol having 10 ethylene oxide groups.

50 percent of the uncovered water evaporated in 6.9 days; covered with a 0.1 mm. alcohol layer without addition in 14.6 days; covered with a 0.1 mm. alcohol layer containing 0.5 percent by weight orthosilicic acid ester of oxyethylated lauryl alcohol in 16.8 days and covered with a 0.1 mm. alcohol layer containing 0.5 percent by weight orthosilicic acid ester of oxyethylated stearyl alcohol in 20.7 days.

The additions increased the retarding of the evaporation. The orthosilicic acid ester of the oxyethylated stearyl alcohol restricted the evaporation to a marked degree in comparison to the orthosilicic acid ester of oxyethylated lauryl alcohol.

The alcohol layers containing 0.5 percent of the orthosilicic acid ester of oxyethylated lauryl alcohol retarded the evaporation at a thickness of the respective layer of 0.01 mm. for one day (after 13 days)
0.1 mm. for about 2 days (after 20 days)
0.5 mm. for about 4 days (after 20 days)
1.0 mm. for about 10 days (after 20 days)

The alcohol layers containing 0.5 percent of the orthosilicic acid ester of oxyethylated stearyl alcohol decreased the evaporation in comparison to the alcohol layers without addition at a thickness of the respective layer of 0.1 mm. for about 6.5 days (after 18 days)
0.5 mm. for about 23.5 days (after about 26 days)
1.0 mm. for about 26.0 days (after about 28 days).

We claim:
1. An evaporation retarding mixture capable of forming a continuous stable film over the surface of a body of water comprising a higher alkyl alcohol having 10 to 20 carbon atoms to which have been added 0.2 to 3 percent by weight of an orthosilicic acid ester of an oxyalkylated alcohol of the general formula:

$$Si[O(C_mH_{2m}O)_nR]_4$$

wherein R represents an alkyl radical having at least 10 carbon atoms, $n$ has a value in the range of from 4 to 30 and $m$ has a value of 2 to 4.
2. The mixture of claim 1 wherein said ester is present in an amount in the range of 0.2 to 0.8 percent by weight, and wherein said alkyl radical has in the range of 10 to 24 carbon atoms.
3. The mixture of claim 1 wherein said higher alkyl alcohols are oxo-alcohols.
4. The mixture of claim 1 wherein $n$ has a value in the range of 6 to 10.
5. The mixture of claim 1 wherein $(C_mH_{2m}O)$ comprises a $(CH_2CH_2O)$— or $(CH_2CH(CH_3)O)$-group.

References Cited
UNITED STATES PATENTS 3,459,492  8/1969  Cawley et al. _____ 21—60.5 R
3,518,047  6/1970  Alsgaard _____ 21—60.5 R RICHARD D. LOVERING, Primary Examiner
I. GLUCK, Assistant Examiner U.S. Cl. X.R.
21—60.5 R, 60.5 A; 106—285; 117—121